United States Patent [19]

Corrigan et al.

[11] Patent Number: 5,245,909
[45] Date of Patent: Sep. 21, 1993

[54] AUTOMATIC SENSOR ALIGNMENT

[75] Inventors: John D. Corrigan, Bridgeton; Dennis E. Simmons, Jr.; Robert L. Berg, both of St. Louis, all of Mo.

[73] Assignee: McDonnell Douglas Corporation, Md.

[21] Appl. No.: 520,272

[22] Filed: May 7, 1990

[51] Int. Cl.$^5$ ............................................. F41G 1/54
[52] U.S. Cl. .................................................. 89/41.19
[58] Field of Search ............. 244/3.1; 89/41.19, 41.21

[56] References Cited

U.S. PATENT DOCUMENTS

| | | | |
|---|---|---|---|
| 4,012,989 | 3/1977 | Hunt et al. | 89/41.19 |
| 4,104,730 | 8/1978 | Morrison et al. | 89/41.19 |

Primary Examiner—Charles T. Jordan

[57] ABSTRACT

A problem faced by designers of advanced electronic military equipment is the strigent angular alignment requirement of aircraft avionics and weapon system sensors. Meeting the alignment requirements in the case of advanced systems presents an ever-increasing problem. In airborne systems, as the alignment requirements of its sensors are becoming more stringent, the aircraft are becoming more flexible structurally. Conventional sensor alignment systems are expensive and utilize complex optical-mechanical equipment and procedures, for instance aircraft jacks, optical targeting boards, precision optical mirrors, sophisticated tooling, and ground support personnel. Past alignment procedures also required ground personnel having the same skill level as those in the aircraft in order to operate such equipment as optical target boards, precision optical mirrors, autocollimators and other instruments. By of this invention a system for aligning avionic/weapon sensors is provided which eliminates the need for support equipment outside the vehicle to boresight and align sensors on the the vehicle. It also allows more flexibility in the location of alignment-sensitive equipment when the vehicle, especially aircraft, is designed.

12 Claims, 1 Drawing Sheet

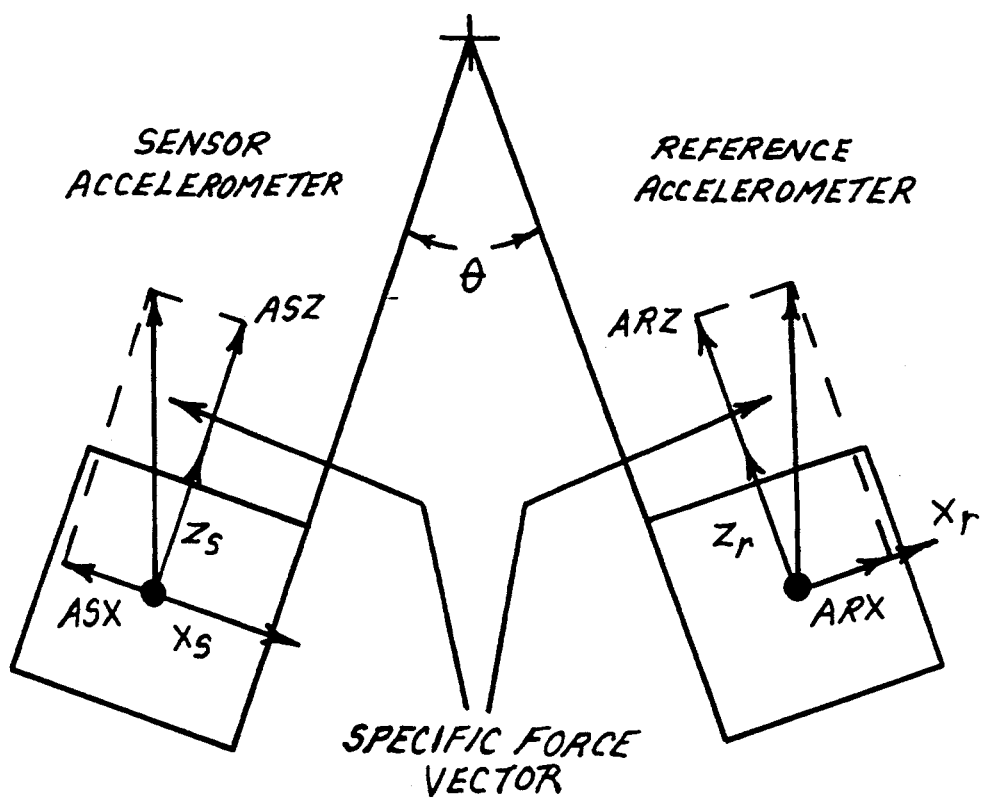

AUTOMATIC SENSOR ALIGNMENT

BACKGROUND OF THE INVENTION

This invention, in one of its aspects, relates to systems for maintaining alignment-sensitive aircraft-borne avionics and weapons sensors in precise alignment. In another aspect the invention relates to a method for precisely aligning any sensitive avionics or weapons system instrument which is subject to vibrations causing detrimental misalignment.

A problem faced by designers of advanced electronic military equipment is the strigent angular alignment requirement of aircraft avionics and weapon system sensors. Sensors such as Inertial Navigation Systems (INS), radar, forward looking infrared sensors (FLIR), head up displays, guns, and missile pylons all require precise alignment of the system sensitive axis. Sensor misalignments result directly in errors in navigation, target tracking, weapon delivery, and the like.

Meeting the alignment requirements in the case of advanced systems presents an ever-increasing problem. In airborne systems, as the alignment requirements of its sensors are becoming more stringent, advanced aircraft are becoming more flexible structurally. This means that ground-based boresighting procedures are too limited, and, therefore, no longer adequate. It also means that aircraft flexure effects must be taken into account during alignment. Because aircraft structural flexure is highly dependent on the aircraft's inflight conditions, some form of inflight alignment technique is required which provides for flexure angle compensation.

The former approach of designers of aircraft systems to the alignment requirement was to mechanically align each vibration sensitive sensor to a specified aircraft body-axis system. This approach required the use of precision machined surfaces, pins, slots, guide rails, and the like, in an attempt to achieve a specified alignment accuracy at the time of installation. It further required the capability of making precision adjustments, such as using shims or other means, in response to precise optical boresight measurements. Often a series of measure-/adjust cycles is required to achieve the desired accuracy. Also, the desired alignment is often sensitive to variables which lead to alignment instability, such as the amount of torque applied to mounting lugs, mechanical creep due to age, landing shocks, temperature changes, and so forth.

Conventional sensor alignment systems are expensive and utilize complex optical-mechanical equipment and procedures, for instance aircraft jacks, optical targeting boards, precision optical mirrors, sophisticated tooling, and ground support personnel. Alignment accuracies deteriorate rapidly as the geometric complexity and separation distance between sensors to be aligned increase. Hence, in addition to being part of an aircraft's routine maintenance schedule, sensor alignment is required whenever an aircraft exceeds maneuver limits or when other general maintenance requires the removal of sensor subsystems.

As indicated, alignment requires considerable skill, sophisticated ground support equipment and time. Past alignment procedures also require ground personnel having the same skill level as those in the aircraft in order to operate such equipment as optical target boards, precision optical mirrors, autocollimators and other instruments. For example, consider the case of adjusting the jacks to simulate the aircraft's inflight orientation at one g for a specified aerodynamic condition. When the jacks are removed, the aircraft resumes an on-the-ground orientation which is often quite different from that with the jacks in place. This difference is associated with the aircraft's sensitivity to the way it is supported, that is, whether it is statically supported on the ground by its wheels, or dynamically supported in flight by its wings. This sensitivity to aircraft flexure under the differing one-g conditions is evidence of the flexure effect at the varying g levels. In addition aerodynamic conditions encountered in combat must be accounted for in the alignment process.

By the practice of this invention a system for aligning avionic/weapon sensors is provided which eliminates the need for support equipment outside the vehicle to boresight and align sensors on the the vehicle. It also allows more flexibility in the location of alignment-sensitive equipment when the vehicle, especially aircraft, is designed.

SUMMARY OF THE INVENTION

Herein an aligning system is provided for maintaining precise alignment of alignment-sensitive avionics sensing, and weapons guidance sensing instruments employed in moving vehicles. A plurality of alignment modules, are mounted on, and in alignment with, an initially precisely aligned sensing instrument. Each alignment module includes an accelerometer triad which is adapted to define an orthogonal coordinate system for sensing instrument orientation in three dimensions. The accelerometers so oriented also generate specific force vectors in that coordinate system. A reference module, including three accelerometers, is also incorporated in the system. These accelerometers are adapted to define a fixed orthogonal vehicle body coordinate system, and to generate specific force vectors relative to that coordinate system. Means are also included for continuously determining from the specific force vectors misalignment angles between alignment modules and the reference module, and for ascertaining a transformation accomplishing alignment. Means then effect the transformation to correct for the misalignment.

BRIEF DESCRIPTION OF THE DRAWING

FIG. 1 is a diagram showing a single axis sensor misalignment.

DETAILED DESCRIPTION OF THE INVENTION

In aircraft one current approach employed to compensate for the effect of aircraft flexure on misalignment angles is to use one of the early approaches described plus an a-priori onboard aircraft flexure model. While the use of an a-priori flexure model somewhat improves the inflight alignment problem, it has little impact on the ground-based problem. The requirements for skill, time and ground support equipment remain. In addition the definition of an adequate a-priori flexure model is difficult to derive, particularly one covering all alignment-sensitive system elements.

Another current approach to the aircraft flexure problem involves a transfer alignment technique, employed in many military systems. This technique involves an alignment transfer between a "master" inertial navigation system and one or more "slave" inertial navigation systems. As originally devised, this technique applies to systems employing some form of gimbal assembly, whose inner element is stabilized to an earth-referenced coordinate system (for example, local vertical geodetic north-east-down) using gyros for stabiliztion and velocities obtained by integrating accelerometer data. The purpose of the technique is to slave the attitude of the inner element of a remote INS to that of the master system. Various degrees of alignment success are achieved depending principally on the quality of the gyros of the slave system.

A feature of the alignment system provided herein is that it includes a three-element alignment accelerometer unit, an accelerometer triad, attached to each alignment-sensitive system element, instrument or sensor. This triad contains three linear accelerometers whose sensing axes define an orthogonal coordinate system. An alignment-sensitive system element is then initially integrated so that its sensing axes define the principal axes of the sensitive element.

Usually the alignment system of this invention will include two or three orthogonally mounted accelerometers, termed alignment accelerometer modules. Initially this alignment system becomes part of the subsystem's normal calibration process. Once the subsystem is installed on the aircraft the misalignment of the sensor sensitive axis can be computed onboard. Misalignment angles are computed for each sensor by comparing the specific force measurements of its accelerometers with those of a reference accelerometer set. Desirably, a strapdown inertial navigation system is selected as the reference accelerometer set. This reference accelerometer set defines the basic body-axis coordinate system used in the system's attitude computations. However, any of the accelerometer units can serve as the reference. It may even be desirable in some designs to locate the reference accelerometers near the center of gravity or on an anti-node of the structural bending modes.

The difference between the reference specific force vector and the modified sensor specific force vector, provides the measure of angular misalignment. The difference can be determined in a number of ways. It can be calculated by a vector cross product of unit vectors along their respective vector directions. This yields an unfiltered misalignment angle vector which can be expressed as a vector because misalignments are small angles. A Kalman filter can also be used. This filter uses a specific force matching technique to compare the acceleration outputs from an alignment accelerometer module to some reference accelerometer. In this manner the misalignment of each avionics/weapon system is automatically computed onboard before each aircraft mission.

PREFERRED EMBODIMENT OF THE INVENTION

The alignment system of the invention works on the basis of specific force matching by comparing the specifc force measured by the alignment accelerometer module (AAM) (which is mounted on the avionics/-weapon subsystem to be aligned) to the specific force measured by some Inertial Measurement Unit (IMU). The accelerometer triad in the AAM defines an orthogonal coordinate system which is fixed to the aircraft body and is taken as the reference coordinate system. Under static conditions the AAM and IMU will observe the same specific force vector (specific force due to gravity, equivalent to $-1$ g) from their respective coordinate frames which are related to each other by some misalignment. The equivalence of the specific force vectors can be used to compute the transformation (misalignment) between the sensor (AAM) and reference (IMU) frames. This point can be demonstrated by an example for a single axis misalignment.

EXAMPLE

We now refer to the alignment system shown in FIG. 1, where the IMU and AAM are misaligned about a single axis through a rotation $\phi$, Asx, Asz, Arz and Arx being the coordinates, and $X_r$, $Z_r$, $X_s$, and $Z_s$ being the vectors. The sensor coordinate is related to the reference coordinate frame through the following matrix:

$$\begin{bmatrix} X_r \\ Z_r \end{bmatrix} = \begin{bmatrix} \cos(\phi) & \sin(\phi) \\ \sin(\phi) & \cos(\phi) \end{bmatrix} \begin{bmatrix} X_s \\ Z_s \end{bmatrix} \qquad \text{Eq. (1)}$$

Equation (1) can be used to perform specific force matching to equate the specific force observed by the AAM and IMU to yield Eq. (2).

$$\begin{bmatrix} Arx \\ Arz \end{bmatrix} = \begin{bmatrix} \cos(\phi) & \sin(\phi) \\ -\sin(\phi) & \cos(\phi) \end{bmatrix} \begin{bmatrix} Asx \\ Asz \end{bmatrix} \qquad \text{Eq. (2)}$$

Equation (2) represents a system of two equations in terms of the known components of specific force, and the unknown misalignment angle $\phi$, from which the following can be derived:

$$Arx = Asx \cos(\phi) + Asz \sin(\phi) \qquad \text{Eq. (3)}$$

$$Arz = -Asx \sin(\phi) + Asz \cos(\phi) \qquad \text{Eq. (4)}$$

Solving equations (3) and (4) for $\phi$ yields the following expression for the misalignment between the two accelerometers.

$$\phi = \sin^{-1}\left( \frac{Asz\,Arx - Arz\,Asx}{Asx^2 + Asz^2} \right) \qquad \text{Eq. (5)}$$

Once the misalignment of the sensor is known, the information can be incorporated into the avionics and weapon systems algorithms.

This result can be similarly readily generalized to misalignments about the three axes. To develop the specific force matching technique for three dimensional misalignments it is first necessary to develop the transformation matrix that relates the orientation of the sensor frame with respect to the reference coordinate in terms of the three misalignment angles. To develop this relationship consider a sensor coordinate frame which is initially aligned with the reference coordinate system. Now allow the sensor frame to undergo three successive right handed rotations about each axis to arrive at some final orientation. The calculations will then be similar to those above, except a 3×3 matrix will be used.

It can be seen that this invention adjusts automatically for structural flexure characteristics as changes occur during flight, such as fuel load, armament, sun effects and the like. It provides automatic alignment on the ground, and during takeoff, as well as in flight, and uses data from preflight and takeoff modes to provide effective initializing of the inflight misalignment angle filters. A process is thus provided for aligning alignment-sensitive weapons and avionics sensors which are subject to misalignment during use.

A process has thus been provided herein which involves generating specific force vectors in an orthogonal coordinate system whose vertical and horizontal axes correspond to the sensor axes. It also includes generating specific force vectors in a reference orthogonal coordinate system corresponding to the aircraft body. Then from the specific force vectors misalignment angles between sensor coordinate systems and the reference coordinate system can be continuously determined, ascertaining a transformation accomplishing alignment, and effecting the transformation to correct for said misalignment.

An advantage of the alignment system of this invention is that it solves the problem of sensor misalignment angles due to aircraft flexure. It does this by providing a real-time measurement of these angles. It also automatically adjusts to changes in the static and dynamic misalignment angles. Changes can result from such factors as, time since installation (that is, the aging effect), current fuel load, current armament load, and sunshine heating effects.

Having been given the teachings of this invention variations, both in use and in structure, will occur to those skilled in the art. Thus the invention is applicable to all moving vehicles utilizing alignment-sensitive system elements such as military aircraft, commercial aircraft, armored tanks, helicopters, ships, aircraft carriers, submarines, spacecraft, missiles, and so forth. In addition, it applies to all kinds of instruments, sensors, radar, INS, FLIR, and gun sighting devices being only examples. Given the specific force vectors any of the known means, such as computer programs and other calculating methods, can be used to determine the misalignment. Such modifications are deemed to be within the scope of this invention.

We claim:

1. An aligning system for maintaining precise alignment of alignment-sensitive guidance and avionics sensing instruments in moving vehicles comprising a plurality of alignment modules, each mounted on, and in alignment with, an initially precisely aligned sensing instrument, each alignment module including an accelerometer triad which is adapted to define an orthogonal coordinate system for sensing instrument orientation in three dimensions, and to generate specific force vectors in that coordinate system, a reference module including three accelerometers which are adapted to define a fixed orthogonal vehicle body coordinate system, and to generate specific force vectors relative to that coordinate system, means for continuously determining from the specific force vectors misalignment angles between alignment modules and the reference module, and for ascertaining a transformation accomplishing alignment, and means effecting the transformation to correct for said misalignment.

2. The aligning system of claim 1 wherein a Kalman filter is included for comparing acceleration outputs.

3. The aligning system of claim 1 wherein the alignment accelerometer module is integrated with a forward looking infrared sensing device.

4. The aligning system of claim 1 wherein the reference accelerometer module is integrated with an inertial navigation system.

5. The aligning system of claim 1 wherein the vehicle is a ship.

6. The aligning system of claim 1 wherein the vehicle is a tank.

7. The aligning system of claim 1 wherein the vehicle is an aircraft.

8. The aligning system of claim 7 wherein the reference module is the aircraft's strapdown inertial navigation system.

9. The aligning system of claim 1 wherein the vehicle is a missile.

10. The aligning system of claim 1 wherein at least part of the alignment system is in a weapon.

11. A process for aligning alignment-sensitive weapons and avionics sensors which are subject to misalignment during use which comprises measuring specific force vectors in a first accelerometer in an orthogonal coordinate system whose vertical and horizontal axes correspond to the sensor axes, measuring specific force vectors in a second accelerometer in a reference orthogonal coordinate system corresponding to the aircraft body, continuously determining from the specific force vectors misalignment angles between the first coordinate system and the reference coordinate system, ascertaining a transformation accomplishing alignment, and effecting the transformation to correct for said misalignment.

12. The aligning process of claim 11 wherein at least one of the alignment steps is in a weapon.

* * * * *